(12) United States Patent
Inoue et al.

(10) Patent No.: US 6,889,804 B2
(45) Date of Patent: May 10, 2005

(54) CLUTCH CONTROL METHOD

(75) Inventors: Eiji Inoue, Fujisawa (JP); Takumi Shinojima, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/179,942

(22) Filed: Jun. 25, 2002

(65) Prior Publication Data

US 2003/0000789 A1 Jan. 2, 2003

(30) Foreign Application Priority Data

Jun. 29, 2001 (JP) ........................................ 2001-199269
Jun. 29, 2001 (JP) ........................................ 2001-199270

(51) Int. Cl.⁷ ........................... B60K 41/22; B60K 41/00
(52) U.S. Cl. ................... 192/3.26; 192/3.3; 192/103 F; 192/109 F
(58) Field of Search ........................... 192/103 F, 109 F, 192/3.58, 3.26, 3.3, 3.31; 74/336 R, 731.1, 335, 333; 477/168, 169, 180, 175, 176

(56) References Cited

U.S. PATENT DOCUMENTS

| | | | |
|---|---|---|---|
| 4,685,548 A | | 8/1987 | Holtermann et al. ........ 192/0.08 |
| 4,732,246 A | * | 3/1988 | Tateno et al. ............. 74/336 R |
| 4,760,902 A | | 8/1988 | Bellanger ................ 192/0.033 |
| 4,799,160 A | | 1/1989 | Arbeille et al. .......... 364/424.1 |
| 4,854,433 A | | 8/1989 | Tellert |
| 5,065,849 A | * | 11/1991 | Kono et al. .................... 477/86 |
| 5,072,815 A | | 12/1991 | Jarvis ........................ 192/0.08 |
| 5,283,738 A | * | 2/1994 | Schwab et al. ............. 192/3.31 |
| 5,378,211 A | * | 1/1995 | Slicker et al. ................ 477/180 |
| 5,549,185 A | | 8/1996 | Kale ............................ 192/12 |
| 5,630,773 A | * | 5/1997 | Slicker et al. ................ 477/176 |
| 6,223,874 B1 | * | 5/2001 | Wheeler ................... 192/103 F |
| 6,227,999 B1 | * | 5/2001 | Wheeler ...................... 477/180 |
| 6,397,998 B1 | * | 6/2002 | Wheeler et al. ............. 477/175 |
| 6,445,992 B2 | * | 9/2002 | Wheeler et al. ............. 477/176 |
| 6,512,971 B2 | * | 1/2003 | Koumura et al. ........... 192/3.31 |

FOREIGN PATENT DOCUMENTS

EP    1 074 754 A1    2/2001

OTHER PUBLICATIONS

Copy of EP Search Report for Serial No. 02 01 4273 dated Nov. 26, 2003.
Copy of EP Search Report for Serial No. 02 01 4273 dated Sep. 22, 2003.

* cited by examiner

Primary Examiner—Rodney H. Bonck
(74) Attorney, Agent, or Firm—McCormick, Paulding & Huber LLP (57) ABSTRACT

The present invention provides a clutch connection method which controls the disconnection/connection of a wet friction clutch on the basis of a duty pulse outputted from an electronic control unit. When the clutch is connected, the electronic control unit initially outputs a start duty (Dst) for largely connecting the clutch as far as the vicinity of a torque point, and, thereafter, outputs, at prescribed time intervals (Δt), a gradual connection duty (Dk) for gradually connecting the clutch, and determines a gradual connection duty value on the basis of a clutch input/output side revolution difference ΔN. Since the clutch is gradually connected while monitoring the clutch connection state, variations between connection times and connection shock, resulting from individual clutch differences or the like, can be eliminated, whereby it is possible to achieve a stable feel. Further, in control which connects the clutch in sync with completion of a transmission gear shift, a plurality of clutch connection modes (an engine plus mode, an in-shaft plus mode, and a synchro mode) are preset, and the clutch connection modes are selected in accordance with the size of clutch input-side and output-side revolution numbers upon completion of a gear shift. Clutch connection is performed which conforms to actual conditions since a clutch connection mode is selected in accordance with the size of clutch input/output side revolution numbers rather than with respect to a shift-up or a shift-down.

20 Claims, 8 Drawing Sheets

| Ds | 160 rpm | 320 rpm | 480 rpm | 640 rpm | 800 rpm | 960 rpm | 1120 rpm | 1280 rpm |
|---|---|---|---|---|---|---|---|---|
| R GEAR | 0005 (H) | 0030 (H) | 0040 (H) | 0050 (H) | 0060 (H) | 0070 (H) | 0080 (H) | 0090 (H) |
| FIRST GEAR | 0005 (H) | 0030 (H) | 0030 (H) | 0030 (H) | 0040 (H) | 0040 (H) | 0040 (H) | 0050 (H) |
| SECOND GEAR | 0005 (H) | 0030 (H) | 0030 (H) | 0030 (H) | 0040 (H) | 0040 (H) | 0040 (H) | 0050 (H) |
| THIRD GEAR | 0005 (H) | 0050 (H) | 0060 (H) | 0070 (H) | 0080 (H) | 0090 (H) | 00A0 (H) | 00B0 (H) |
| FOURTH GEAR | 0100 (H) | 0100 (H) | 0100 (H) | 0100 (H) | 0100 (H) | 0200 (H) | 0300 (H) | 0400 (H) |
| FIFTH GEAR | 0100 (H) | 0100 (H) | 0100 (H) | 0100 (H) | 0100 (H) | 0200 (H) | 0300 (H) | 0400 (H) |
| SIXTH GEAR | 0100 (H) | 0100 (H) | 0100 (H) | 0100 (H) | 0100 (H) | 0200 (H) | 0300 (H) | 0400 (H) |

ΔN (SHIFT-UP CASE)

GEAR LEVEL

FIG. 8

| Ds | 160 rpm | 320 rpm | 480 rpm | 640 rpm | 800 rpm | 960 rpm | 1120 rpm | 1280 rpm |
|---|---|---|---|---|---|---|---|---|
| R GEAR | 0005 (H) | 0008 (H) | 0008 (H) | 0008 (H) | 0010 (H) | 0020 (H) | 0030 (H) | 0030 (H) |
| FIRST GEAR | 0005 (H) | 0005 (H) | 0008 (H) | 0008 (H) | 0010 (H) | 0020 (H) | 0030 (H) | 0030 (H) |
| SECOND GEAR | 0005 (H) | 0005 (H) | 0008 (H) | 0010 (H) | 0020 (H) | 0020 (H) | 0030 (H) | 0050 (H) |
| THIRD GEAR | 0005 (H) | 0080 (H) | 0100 (H) | 0200 (H) | 0100 (H) | 0030 (H) | 0040 (H) | 0050 (H) |
| FOURTH GEAR | 0005 (H) | 0200 (H) | 0200 (H) | 0200 (H) | 0100 (H) | 0100 (H) | 0080 (H) | 0080 (H) |
| FIFTH GEAR | 0100 (H) | 0200 (H) | 0200 (H) | 0200 (H) | 0100 (H) | 0100 (H) | 0080 (H) | 0080 (H) |
| SIXTH GEAR | 0100 (H) | 0100 (H) | 0100 (H) | 0100 (H) | 0100 (H) | 0100 (H) | 0080 (H) | 0080 (H) |

ΔN

(SHIFT-DOWN CASE)

GEAR LEVEL

FIG. 9

MODE SELECTION CONDITIONS (1) VEHICLE SPEED V < V1 = 3km / h ⇒ GARAGE SHIFT MODE : MODE G
(2) VEHICLE SPEED V ≥ V1
    REVOLUTION DIFFERENCE ΔN
    = ENGINE REVOLUTION NUMBER Ne − INPUTSHAFT REVOLUTION NUMBER Ni

IN-SHAFT PLUS MODE : MODE I (FOR A SHIFT DOWN)
ENGINE PLUS MODE : MODE E (FOR A SHIFT UP)
SYNCHRO MODE : MODE S

FIG. 10

MODE G : GARAGE SHIFT MODE (a) START DUTY Dst (G)
(b) GRADUAL CONNECTION DUTY INITIAL VALUE Dk0 (G)
(c) STEP DUTY Ds (G)

| Ds | REVOLUTION DIFFERENCE ΔN | | | | |
|---|---|---|---|---|---|
| GEAR LEVEL | | | | | |
| | | | | | |
| | | | | | |
| | | | | | |

(d) GRADUAL CONNECTION END DUTY De (G)

MODE E : ENGINE PLUS MODE
   (a) START DUTY Dst (E)
   (b) GRADUAL CONNECTION DUTY INITIAL VALUE Dk0 (E)
   (c) STEP DUTY Ds (E)

FIG.11

| Ds | REVOLUTION DIFFERENCE ΔN | | | | |
|---|---|---|---|---|---|
| GEAR LEVEL | | | | | |
| | | | | | |
| | | | | | |
| | | | | | |

(d) GRADUAL CONNECTION END DUTY De (E)

MODE I : IN-SHAFT PLUS MODE
   (a) START DUTY Dst (I)
   (b) GRADUAL CONNECTION DUTY INITIAL VALUE Dk0 (I)
   (c) STEP DUTY Ds (I)

FIG.12

| Ds | REVOLUTION DIFFERENCE ΔN | | | | |
|---|---|---|---|---|---|
| GEAR LEVEL | | | | | |
| | | | | | |
| | | | | | |
| | | | | | |

(d) GRADUAL CONNECTION END DUTY De (I)

MODE S : SYNCHRO MODE
   (a) START DUTY Dst (S)
   (b) GRADUAL CONNECTION DUTY INITIAL VALUE Dk0 (S)
   (c) STEP DUTY Ds (S)

FIG.13

| Ds | REVOLUTION DIFFERENCE ΔN | | | | |
|---|---|---|---|---|---|
| GEAR LEVEL | | | | | |
| | | | | | |
| | | | | | |
| | | | | | |

(d) GRADUAL CONNECTION END DUTY De (S)

CLUTCH CONTROL METHOD

CROSS REFERENCES TO RELATED APPLICATIONS

This application is entitled to the benefit of and incorporates by reference essential subject matter disclosed in Japanese Patent Applications No. 2001-199269 filed Jun. 29, 2001 and No. 2001-199270 filed Jun. 29, 2001.

BACKGROUND OF THE INVENTION

1. Field of the Invention

The present invention relates to a clutch control method, and more particularly to a method for controlling the connection/disconnection of a wet friction clutch which is provided in a power transmission system of a vehicle.

2. Description of the Related Art

The present inventors have newly developed a vehicle power transmission device, in which a fluid coupling capable of being locked up (including a torque converter) and a wet friction clutch are serially provided between the engine and transmission, and which automatically connects and disconnects the wet friction clutch during transmission. Here, if the vehicle is put into gear while stationary, the clutch is subsequently automatically connected, and creep is generated thereby. This point is similar to an ordinary AT (Automatic Transmission) vehicle. On the other hand, while the vehicle is traveling after starting off, the fluid coupling is locked up, and the clutch is automatically disconnected/connected at each transmission gear shift. This point is similar to an ordinary MT vehicle.

When connection of the clutch is too rapid, this produces a clutch connection shock (so-called "garage shock" or similar), and when the clutch connection is too slow, it takes time from the gear-in operation until the generation of creep, and the driver does not know when to step on the accelerator (large time lag). Therefore, for the purpose of achieving compatibility between clutch connection shock and a shortening of the connection time, control is performed such that the clutch is rapidly connected in an idle region up until when the clutch begins to connect, and is slowly connected by switching the connection speed once the clutch begins to connect.

More specifically, the working fluid pressure for driving the disconnection/connection of the clutch is changed in accordance with a duty pulse outputted from an electronic control unit, and, when connecting the clutch from a disconnected state, a prescribed start duty for largely connecting the clutch as far as the vicinity of the position in which the clutch begins to connect is initially outputted from the electronic control unit (this will be referred to as a single connection), and, thereafter, a prescribed gradual connection duty for gradually connecting the clutch is outputted from the electronic control unit at prescribed time intervals.

The position in which the clutch begins to connect, i.e. the torque transmission start point at which it is initially possible to transmit a prescribed torque, is known as the "torque point", and this torque point is utilized, for example, as a connection speed switching point, by making the control unit learn this torque point. This torque point is taken as a learning value since variations or individual differences exist between clutches which are caused by production errors or similar, and the torque point is different for each clutch.

Meanwhile, at the start of development, clutch gradual connection control was open-loop control which outputted a gradual connection duty according to a predetermined schedule. However, as a result of individual differences, such as variations in the torque point learning value, in the clutch characteristics, or in the oil temperature, and the like, and/or deviations in the usage conditions, problems occurred such as the generation of clutch connection shock or a long connection time, which in turn resulted in the inconvenience of an unstable feel.

Meanwhile, with regard to clutch connection control at the time of a gear shift while the vehicle is traveling, at the start of development, shift-up and shift-down clutch connection modes were preset, and such modes were used properly according to whether a shift-up or a shift-down was actually performed.

However, it was established that it is insufficient to simply modify the clutch connection method in terms of only a shift-up or a shift-down. For example, when shifting down from third gear to second gear, it is ordinarily sufficient to connect the clutch in accordance with a shift-down mode following a gear shift to second gear. However, when the clutch is connected by putting the vehicle into neutral from third gear, and then into second gear after coasting a short while until the vehicle speed has dropped sufficiently, there are also times when a better feel is afforded by connecting the clutch in accordance with a shift-up mode instead.

Therefore, a method in which proper usage of clutch connection modes is made using only a judgement of a shift-up or a shift-down is limited in its conformance with a clutch connection feel in all conditions, and, depending on the conditions, there are cases where a clutch connection shock, a connection time lag, and the like, are produced.

SUMMARY OF THE INVENTION

The present invention was therefore devised in view of the problems above, an object thereof being to achieve compatibility between connection shock and connection time during clutch gradual connection, and to thereby achieve a stable feel.

In addition, it is a further object of the present invention to obtain, with regard to clutch connection control at the time of a gear shift, a suitable clutch connection feel under any conditions.

The present invention is a clutch control method for controlling connection/disconnection of a clutch by changing the working fluid pressure for driving the connection/disconnection of a wet friction clutch in accordance with a duty pulse outputted from an electronic control unit, according to which method, when connecting the clutch from a disconnected state, a prescribed start duty for largely connecting the clutch as far as the vicinity of a torque point is initially outputted from the electronic control unit, and, thereafter, a prescribed gradual connection duty for gradually connecting the clutch is outputted from the electronic control unit at prescribed time intervals, and a gradual connection duty value at each prescribed time interval is determined on the basis of a clutch input/output side revolution difference.

Accordingly, since the clutch can be gradually connected while continually monitoring the clutch connection state, variations between connection times and connection shock resulting from individual clutch differences or the like, can be eliminated, whereby it is possible to achieve a stable feel.

Here, the above-mentioned wet friction clutch is between the engine and the transmission and serially provided downstream of the fluid coupling capable of lockup, and the above-mentioned clutch input/output side revolution difference is preferably determined based on the engine revolution number when the fluid coupling is locked up, and the transmission input shaft revolution number.

Further, the above-mentioned clutch input/output side revolution difference is preferably a value produced by subtracting the input shaft revolution number from the engine revolution number for a shift-up case, and, by subtracting the engine revolution number from the input shaft revolution number for a shift-down case.

The gradual connection duty value at prescribed time intervals mentioned above is calculated by adding or subtracting a step duty, determined on the basis of the above clutch input/output side revolution difference, with respect to the previous gradual connection duty value, and two types are preferably set for this step duty value at least for a shift-up case and for a shift-down case.

The step duty value mentioned above is preferably selected from a map whose parameters are taken to be the transmission gear level and the clutch input/output side revolution difference.

In the course of the gradual connection duty output, if the clutch input/output side revolution difference reaches or becomes lower than a prescribed value, a duty corresponding to a complete connection of the clutch is preferably outputted by the above electronic control unit.

In addition, the present invention is a clutch control method for controlling connection/disconnection of the clutch in accordance with a duty pulse which is outputted from an electronic control unit, in a vehicle power transmission device in which a wet friction clutch is provided midway along a power transmission path extending from the engine to the transmission, which method commences clutch connection control at the same time as the transmission is geared in to a next gear shift level during a gear shift while the vehicle is traveling; and, thereafter, during clutch gradual connection control, if the clutch input/output side revolution difference reaches or becomes lower than a prescribed value, a duty corresponding to a complete connection of the clutch is outputted from the above electronic control unit.

Here, a fluid coupling capable of lockup is provided upstream of the wet friction clutch in the power transmission path; the clutch input-side revolution number is the engine revolution number during lockup of the fluid coupling, and the clutch output-side revolution number is the transmission input shaft revolution number, and, the revolution difference is preferably a value produced by subtracting the input shaft revolution number from the engine revolution number for a shift-up case, and, by subtracting the engine revolution number from the input shaft revolution number for a shift-down case.

The present invention is a method, which, by means of an electronic control unit, disconnects a clutch in sync with the start of a transmission gear shift, and connects the clutch in sync with completion of the transmission gear shift, wherein, with regard to clutch connection control, a plurality of clutch connection modes are preset, and the clutch connection modes are selected in accordance with the size of a clutch input-side revolution number and output-side revolution number upon completion of a gear shift.

Accordingly, clutch connection is performed which conforms to actual conditions since a clutch connection mode is selected in accordance with the size of clutch input/output side revolution numbers rather than for a shift-up or a shift-down.

Here, it is preferable that the clutch should be provided serially downstream of a fluid coupling capable of lockup which is between the engine and the transmission; that the clutch input-side revolution number should be an engine revolution number upon lockup of the fluid coupling; and that the clutch output-side revolution number should be a transmission input shaft revolution number.

Furthermore, it is preferable that the plurality of clutch connection modes should comprise a first mode, which is applied when a revolution difference, which is obtained by subtracting the clutch output-side revolution number from the clutch input-side revolution number upon gear shift completion, is equal to or greater than a positive first prescribed value; a second mode, which is applied when the revolution difference is equal to or less than a negative second prescribed value; and a third mode, which is applied when the revolution difference is smaller than the positive first prescribed value and is greater than the negative second prescribed value.

Further, it is preferable that the clutch should be controlled by being disconnected/connected in accordance with a duty pulse outputted from the electronic control unit; that, when performing clutch connection control, the electronic control unit should initially output a prescribed start duty for largely connecting the clutch as far as the vicinity of a torque point, and, thereafter, should output, at prescribed time intervals, a prescribed gradual connection duty for gradually connecting the clutch, and should determine a gradual connection duty value at each prescribed time interval on the basis of a clutch input/output side revolution difference; and that the start duty and the gradual connection duty should be determined in each respective clutch connection mode.

BRIEF DESCRIPTION OF THE DRAWINGS

FIGS. 5a–5d is a time chart showing the details of the clutch connection control according to the embodiment of the present invention, and is for a shift-up case;

FIGS. 6a–6d is a time chart showing the details of the clutch connection control according to the embodiment of the present invention, and is for a shift-down case;

FIG. 7 is a step duty calculation map at the time of a shift-up according to the embodiment of the present invention;

FIG. 8 is a step duty calculation map at the time a shift-down according to the embodiment of the present invention;

DESCRIPTION-OF THE PREFERRED EMBODIMENTS

A preferred embodiment of the present invention will be described hereinbelow with reference to the attached drawings.

Figure 1:
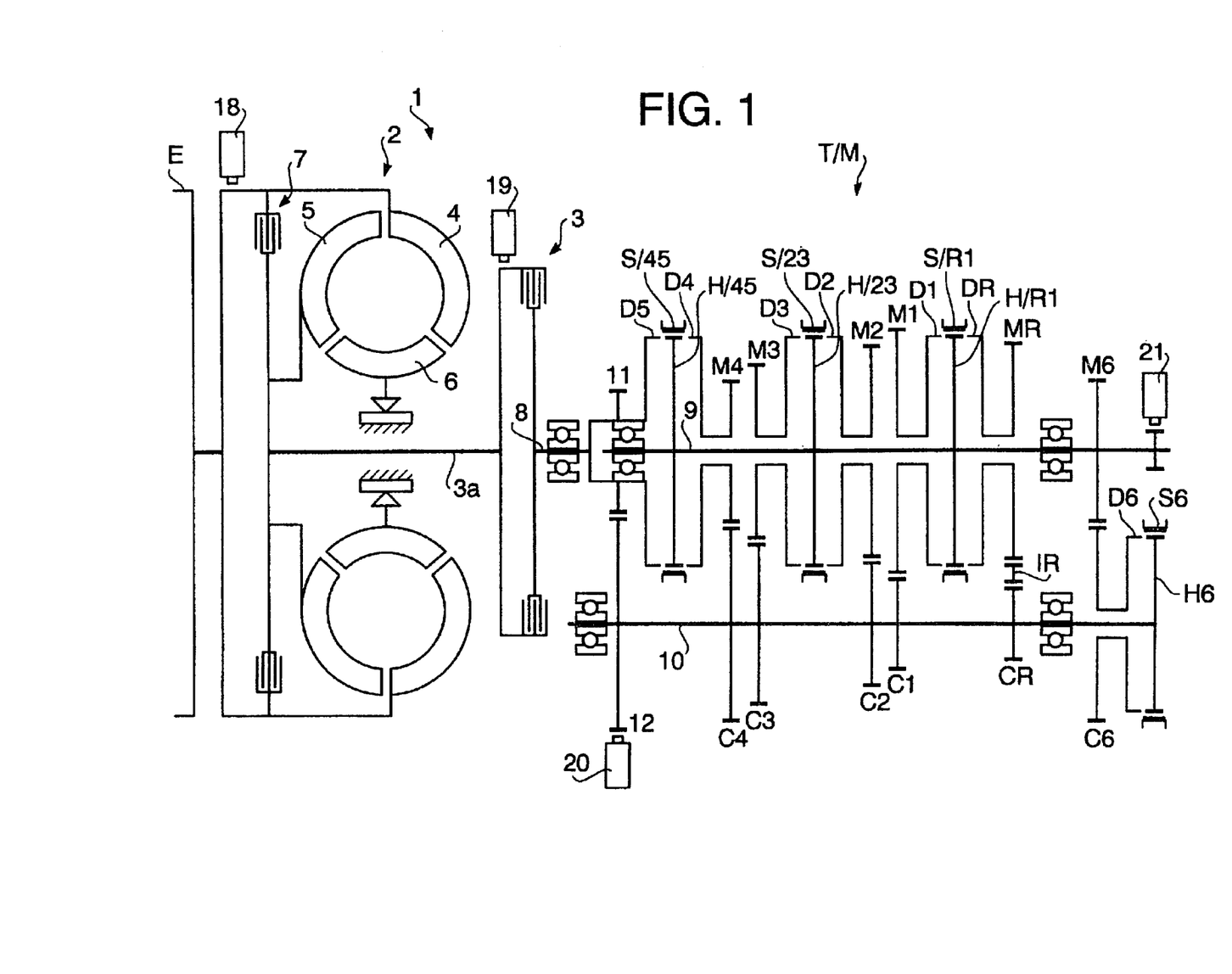
FIG. 1 is a skeleton drawing of a power transmission device of a vehicle, according to the embodiment of the present invention.

FIG. 1 shows a power transmission device of a vehicle, according to the present embodiment. As shown by the figure, a clutch mechanism 1 is provided between the engine E and the transmission T/M, and the clutch mechanism 1 is constituted from a fluid coupling 2, which is provided upstream in the power transmission direction; and, provided serially downstream therefrom, a wet multi-plate clutch 3 serving as a wet friction clutch. Also, the fluid coupling here is a broad concept comprising a torque converter, and a torque converter is actually also used in the present embodiment. A vehicle to which the present invention is applied is a relatively large vehicle with tracks, or similar. The engine E is a diesel engine.

The fluid coupling 2 has a pump 4, which is connected to the output shaft (crank shaft) of the engine; a turbine 5, which faces toward the pump 4 and is connected to the input side of the clutch 3; and a starter 6, which is provided between the turbine 5 and the pump 4. Also, provided in parallel with the fluid coupling 2 is a lockup clutch 7 which is capable of locking up the fluid coupling 2 by connecting/disconnecting the pump 4 and turbine 5. The input side of the wet multi-plate clutch 3 is connected to the turbine 5 via an input shaft 3a, and the output side thereof is connected to an input shaft 8 of the transmission T/M, and the wet multi-plate clutch 3 thus connects/disconnects between the fluid coupling 2 and the transmission T/M.

The transmission T/M has an input shaft 8; an output shaft 9 arranged coaxially therewith; and a counter shaft 10 arranged in parallel with the input shaft 8 and the output shaft 9. An input main gear 11 is provided on the input shaft 8. The output shaft 9 axially supports a first main gear M1, a second main gear M2, a third main gear M3, a fourth main gear M4 and a reverse main gear MR, respectively, and a sixth main gear M6 is provided fixed to the output shaft 9. Gears which are provided fixed to the counter shaft 10 are: an input secondary gear 12 that engages with the input main gear 11; a first secondary gear C1 that engages with the first main gear M1; a second secondary gear C2 that engages with the second main gear M2; a third secondary gear C3 that engages with the third main gear M3; a fourth secondary gear C4 that engages with the fourth main gear M4; and a reverse secondary gear CR that engages with the reverse main gear MR via an idle gear IR, and a sixth secondary gear C6 that engages with the sixth main gear M6 is also axially supported by the counter shaft 10.

According to this transmission T/M, upon spline-engaging the sleeve S/R1, which has been spline-engaged with a hub H/R1 which is fixed to the output shaft 9, with the dog DR of the reverse main gear MR, the output shaft 9 rotates in reverse, and, when the sleeve S/R1 is spline-engaged with the dog D1 of the first main gear M1, the output shaft 9 rotates in sympathy with the first gear. Also, upon spline-engaging the sleeve S/23, which has been spline-engaged with the hub H/23 fixed to the output shaft 9, with the dog D2 of the second main gear M2, the output shaft 9 rotates in sympathy with the second gear, and, upon spline-engaging the sleeve S/23 with the dog D3 of the third main gear M3, the output shaft 9 rotates in sympathy with the third gear.

Further, upon spline-engaging the sleeve S/45, which has been spline-engaged with a hub H/45 which is fixed to the output shaft 9, with the dog D4 of the fourth main gear M4, the output shaft 9 rotates in sympathy with the fourth gear, and, when the sleeve S/45 is spline-engaged with the dog D5 of the input main gear 11, the output shaft 9 rotates in sympathy with (directly with) the fifth gear. Also, upon spline-engaging the sleeve S6, which has been spline-engaged with a hub H6 which is fixed to the counter shaft 10, with the dog D6 of the sixth secondary gear C6, the output shaft 9 rotates in sympathy with the sixth gear. Each of the sleeves above is manually operated using a shift lever inside the cab via a shift fork and shift rod not shown in the figure. In other words, transmission T/M is a manual type transmission.

Figure 2:
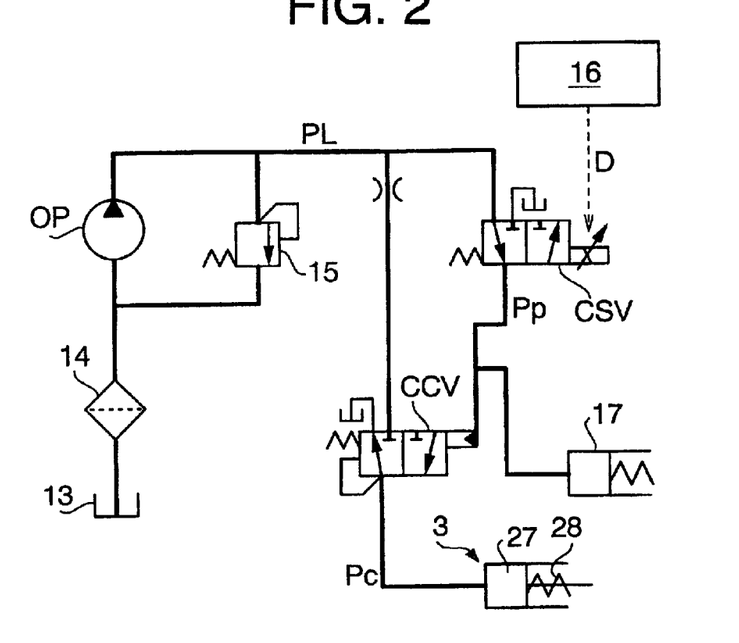
FIG. 2 is an oil hydraulic circuit diagram showing an oil pressure supply device according to the embodiment of the present invention.

The wet multi-plate clutch 3 has an ordinary constitution. In other words, although not illustrated in the figures, each of a plurality of mutually different clutch plates are spline-engaged with the input and output sides within the clutch casing which is filled with oil, and the connection/disconnection of the clutch is performed by pressing together or releasing these clutch plates by means of a clutch piston. Referring to FIG. 2, the clutch piston 27 is constantly biased toward the disconnection side by the clutch spring 28, and when an oil pressure exceeding such biasing is applied to the clutch piston 27, the clutch 3 is linked. The clutch linkage force and the torque capacity of the clutch increase in accordance with the oil pressure applied.

Next, an oil pressure supply device for supplying a working oil pressure to the wet multi-plate clutch 3 will be described. As shown in FIG. 2, the oil in an oil tank 13 is drawn in and discharged by the oil pressure pump OP via a filter 14, and the discharge pressure of the oil is adjusted using a relief valve 15 in order to create a constant line pressure PL. The oil of this line pressure PL is fed to the clutch 3 by controlling the pressure (depressurization), and, for this purpose, two valves, namely a clutch control valve CCV and a clutch solenoid valve CSV, are employed. In other words, a piloted oil pressure control system is adopted in which the clutch control valve CCV connected to the main oil pressure line is opened and closed in accordance with the piloted oil pressure Pp delivered from the clutch solenoid valve CSV. In addition, the size of the piloted oil pressure Pp is changed in accordance with the duty pulse outputted from the electronic control unit (termed ECU hereinafter) 16.

In other words, the clutch solenoid valve CSV is an electromagnetic valve having an electromagnetic solenoid, and which, as well as being capable of opening/closing seamlessly, supplies the line pressure PL continually. Further, the clutch solenoid valve CSV receives the duty pulse outputted from the ECU 16, and causes the valve to open by an amount corresponding to the corresponding duty (duty ratio) D. Thus, the clutch solenoid valve CSV then outputs the piloted oil pressure Pp in accordance with the duty D.

The clutch control valve CCV is a spool valve capable of being controlled seamlessly on the basis of the piloted oil pressure Pp, and is itself not electronically controlled. In other words, an internal spool is stroked open in accordance with the size of the piloted oil pressure Pp, and the line pressure PL is thus suitably adjusted and delivered to the clutch 3 as a clutch pressure Pc. The oil pressure supplied to the clutch 3 is consequently duty-controlled by means of the ECU 16.

Further, an accumulator 17 is provided midway along the path connecting the clutch solenoid valve CSV and the clutch control valve CCV.

Figure 3:
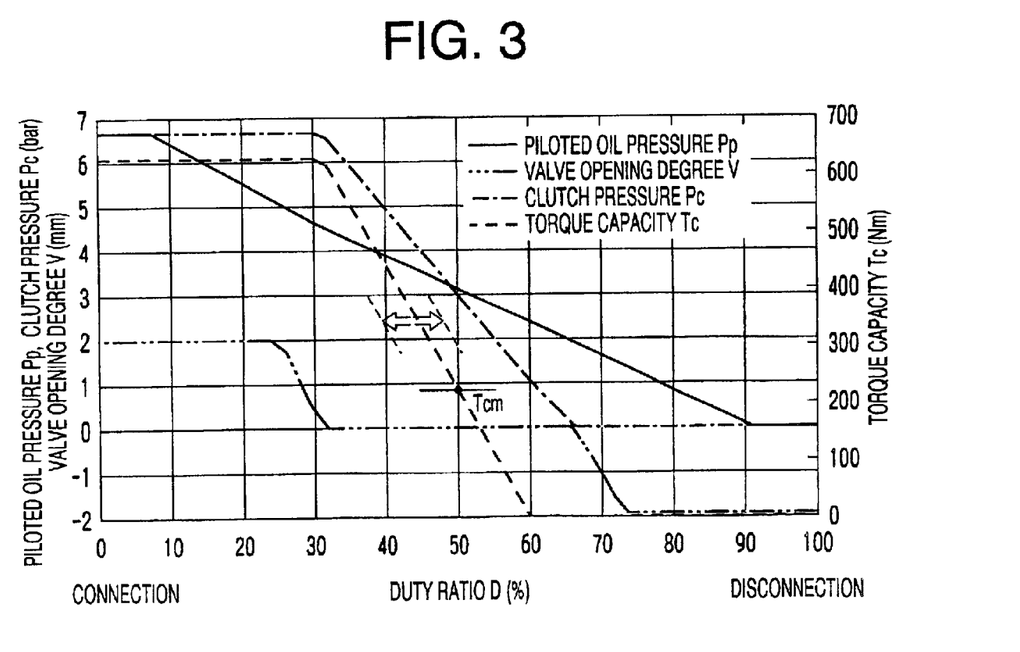
FIG. 3 is a characteristic line diagram of an oil pressure supply device according to the embodiment of the present invention.

FIG. 3 shows a characteristic line diagram for an oil pressure supply device. The horizontal axis represents the duty D of the duty pulse outputted from the ECU 16, and more particularly is an ON duty that indicates a percentage of the solenoid ON time in the basic control cycle (20 msec in the present embodiment). In the present embodiment, the clutch is completely connected when the duty D is 0(%).

This is so that the clutch is in a connected state and it is thus possible to maintain vehicle travel one way or another even when electricity no longer flows to the clutch solenoid valve CSV (so-called off stack state) due to faults with an electrical system, or the like.

As shown in the diagram, the larger the duty D, the greater the disconnection, and the smaller the duty D, the greater the connection. The diagram shows a tendency according to which, as the value of the duty D becomes smaller, the value of the piloted oil pressure Pp, which is outputted from the clutch control valve CCV, increases proportionally, and, accordingly, the oil pressure, that is, the clutch pressure Pc supplied to the clutch, and the torque capacity Tc of the clutch 3 increase proportionally. Further, the valve opening degree V of the clutch control valve CCV is in three positions in the diagram, but, in reality, the spool valve makes a small stroke when opened completely or at an intermediate degree of opening other than when completely closed (the valve opening degree is 0 mm in the diagram), and the clutch pressure Pc can be continuously changed thereby.

Though a control system for the lockup clutch 7 also exists in the present embodiment, a description thereof is omitted here since such control system does not directly relate to the present invention. The constitution of this oil pressure control system is largely the same as that for the oil pressure control system of the wet multi-plate clutch 3.

Figure 4:
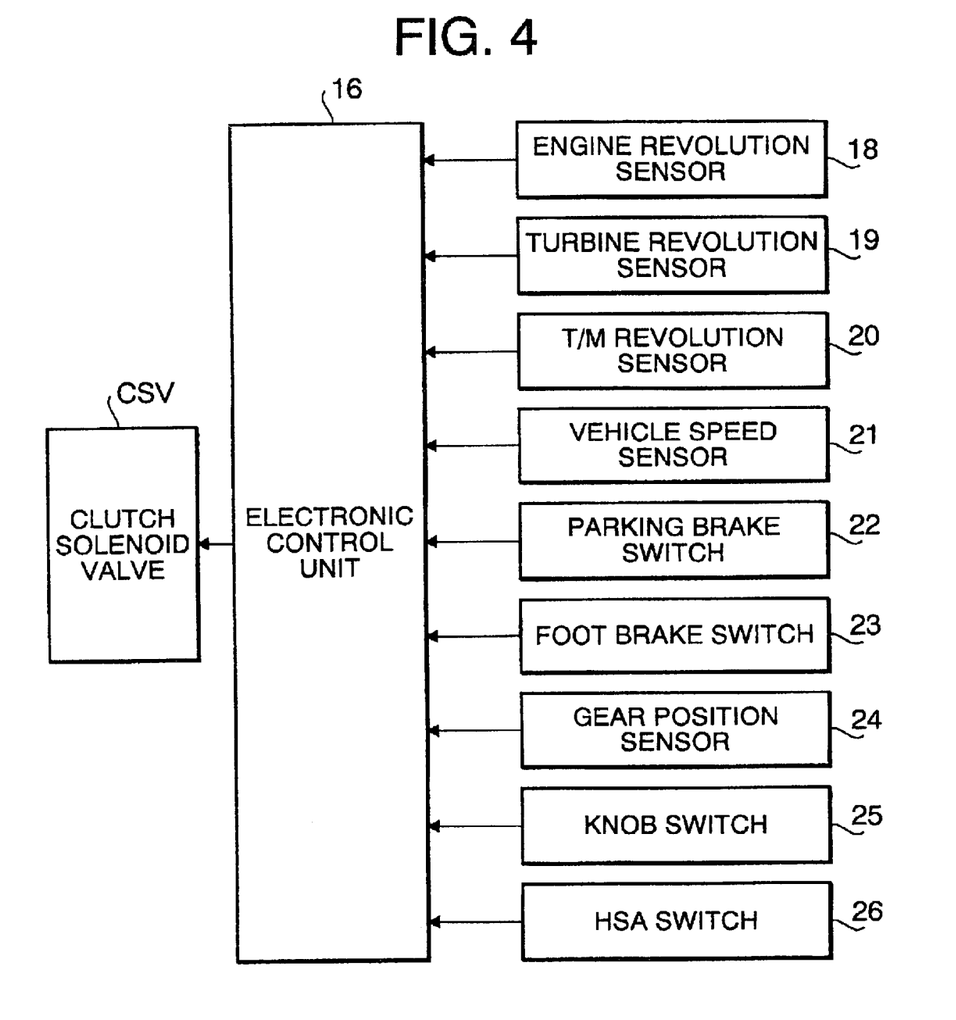
FIG. 4 is a constitutional view of an electronic control device according to the embodiment of the present invention.

Next, an electronic control device for electronically controlling a power transmission device will be described using FIG. 4. In addition to the clutch solenoid valve CSV, a variety of switches and sensors, and the like, for electronically controlling the present device, are connected to the above-described ECU 16. These include an engine revolution sensor 18 for detecting the engine revolution number; a turbine revolution sensor 19 for detecting the revolution number of the input side of the clutch 3, that is, the revolution number of the turbine 5; a transmission revolution sensor 20 for detecting the revolution number of the transmission T/M, and the revolution number of the input secondary gear 12 representatively; and a vehicle speed sensor 21 for detecting the vehicle speed. These sensors are shown in FIG. 1. More particularly, the ECU 16 calculates the revolution number of the input shaft 8 from the output of the transmission revolution sensor 20 and from the gear ratio between the input main gear 11 and the input secondary gear 12, and this is taken to be the revolution number on the output side of the clutch 3. In other words, the means for detecting the revolution number on the clutch output side is the transmission revolution sensor 20.

Further, a parking brake switch 22 for detecting whether or not the parking brake is being operated, a foot brake switch 23 for detecting whether or not the foot brake is being operated, and a gear position sensor 24 for detecting the transmission gear position, are also connected to the ECU 16.

A knob switch 25 is also connected to the ECU 16. In other words, in the present-embodiment, in order to detect the start time of a gear shift operation by the driver, or to determine the timing for the start of clutch disconnection, a shift knob is attached so as to be capable of turning slightly in a gear shift direction with respect to the cab shift lever, and a knob switch 25 is provided between this lever and shift knob. Further, when the shift knob turns before the movement of the lever at the time of a gear shift operation by the driver, the knob switch 25 is turned ON, which is taken as a signal for the start of clutch disconnection. The specific constitution is like that shown in Japanese Patent Application Laid-Open No. H11-236931.

Also, a hill start auxiliary device (HSA; Hill Start Aid) of the kind illustrated in the same publication above is provided in the power transmission device of the present embodiment, and an HSA switch 26 for manually turning this device ON/OFF is provided in the driver's cab, this HSA switch 26 being connected to the ECU 16.

Next, the operation and control method of the power transmission device of the present embodiment will be described.

According to this power transmission device, the power of the engine E is transmitted in order to the fluid coupling 2, the wet multi-plate clutch 3, and the transmission T/M. In principle, the lockup clutch 7 is continually ON (connected) after the vehicle has started traveling and OFF (disconnected) when the vehicle is stationary and when the vehicle starts to travel. Consequently, the creep of the fluid coupling 2 can be utilized at the time the vehicle starts traveling as is the case for an AT vehicle, and, in comparison to performing electronic start-off control of the friction clutch, control is then simple, and it is possible to prevent loss produced by slippage since the fluid coupling 2 is locked up while the vehicle is traveling. The wet multi-plate clutch 3 is disconnected each time a gear shift takes place. This is the same as for an ordinary MT vehicle.

Here, to describe the control of connection/disconnection of the lockup clutch 7 in detail, the lockup clutch 7 is connected at or higher than a prescribed speed (approximately 10 km/h in the present embodiment) which is a relatively low vehicle speed. More precisely, the connection of the lockup clutch is made in each gear level when the input shaft revolution number reaches or becomes higher than a prescribed revolution number (uniformly 900 rpm in the present embodiment). The vehicle starts traveling at a starting gear level (for example, second gear, which is widely used as a starting gear level), and, when the input shaft revolution number reaches the prescribed revolution number (900 rpm), the lockup clutch is connected, and, at such time, the vehicle speed is low (approximately 10 km/h).

First, operation at the time the vehicle starts traveling will be described. Let us assume that, while the vehicle is stationary and in neutral, the driver operates the shift lever to a starting gear level to start traveling. Then, in the shift lever, as a result of the shift knob turning before the movement of the lever, the knob switch 25 is turned ON, which is taken as a signal to segment the clutch 3. Further, the transmission T/M is put into gear at a starting gear level as a result of the shift lever being operated subsequently, and the clutch 3 is connected when this gear shift is detected by the gear position sensor 24. Since the turbine 5 is stopped from the drive wheel side as a result of this connection, the pump 4 slides against the turbine 5, and creep is generated thereby. Consequently, thereafter, upon releasing the brake or stepping on the accelerator, and so forth, the vehicle starts to move.

Next, the operation at the time of a gear shift while the vehicle is traveling will be described. Let us assume that, when the vehicle is traveling with a prescribed gear level, the driver operates the shift lever to the next gear shift level to change gear. Then, the shift knob turns before the movement of the lever and the knob switch 25 is turned ON, which is taken as a signal to segment the clutch 3. The transmission T/M is geared in to the next gear shift level as a result of the shift lever being operated further, and the clutch 3 is connected when this gear shift is detected by the gear position sensor 24. The gear shift is thus complete. The lockup clutch 7 remains ON during the gear shift, and the engine power is transmitted to the clutch 3 as is.

Next, the clutch control methods according to the present embodiments will be described.

[First Control Method]

Figure 5A:
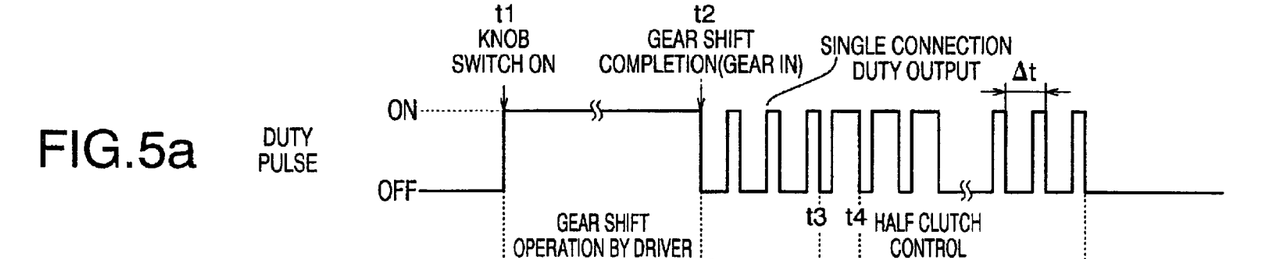
Figure 5B:
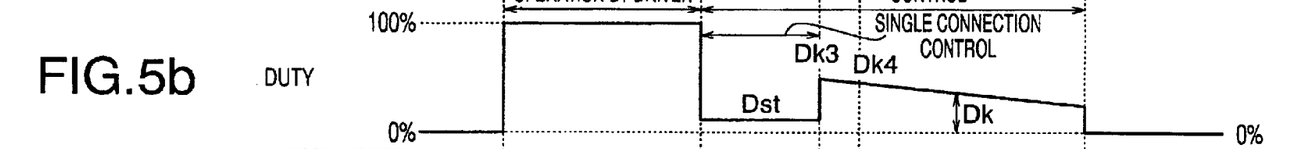
Figure 5C:
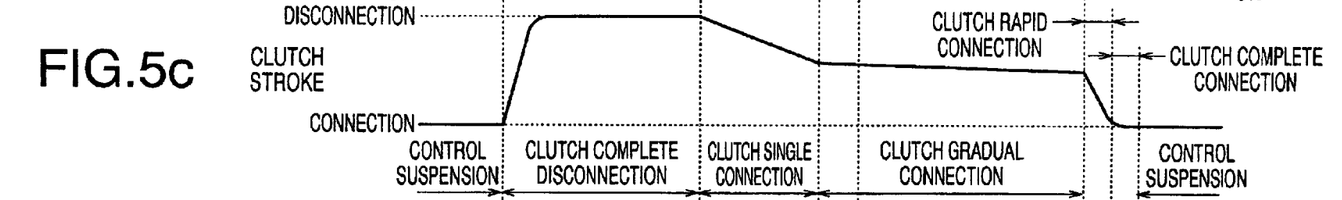
Figures 6A, 6B:
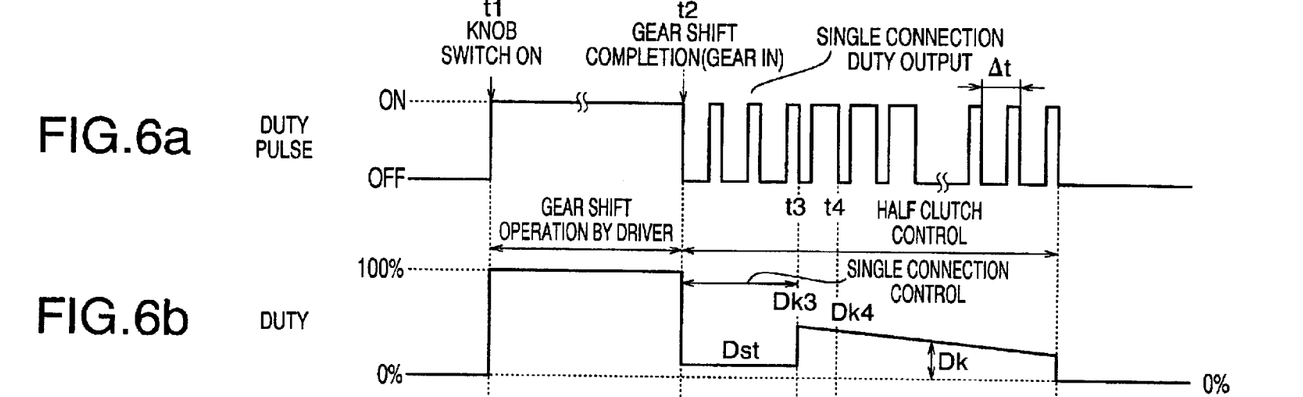
Figure 6C:
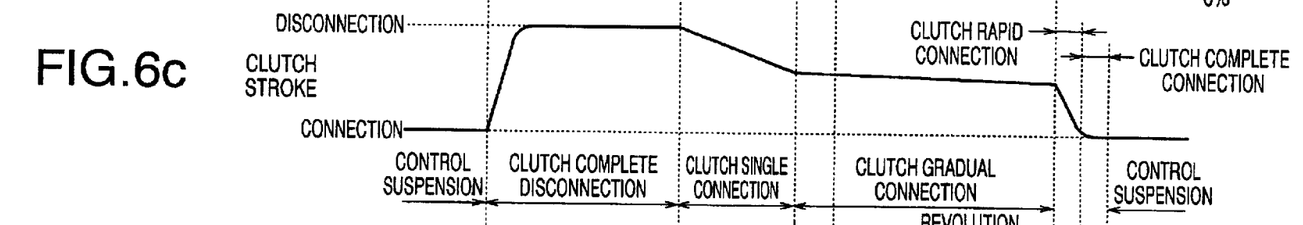

The clutch control method while the vehicle is traveling will now be described using FIGS. 5a–5d and 6a–6d. FIGS. 5a–5d is for a shift-up case, and FIGS. 6a–6d is for a shift-down case. A description will be provided first for a shift-up case.

As shown in FIGS. 5a–5d, the clutch is completely disconnected as a result of the knob switch being ON (t1), and when the shift lever is operated for the next gear shift level, clutch connection commences (t2).

First of all, single connection control is executed. In other words, a start duty (single connection duty) Dst for largely connecting the clutch 3 as far as the vicinity of the torque point is outputted from the ECU 16. The start duty Dst of the present embodiment is 10(%) when the temperature is normal and 60(%) when the temperature is low. An invalid stroke (idle stroke) of the clutch piston 27 is present in the clutch 3 at the start of connection, but, by means of single connection control, a rapid connection is made for this invalid stroke, which in turn permits a shortening of the connection time. Here, referring to FIG. 3, the start duty Dst=10(%) when the temperature is normal is a value that corresponds to the complete connection of the clutch, but the output time interval for this start duty is minimal (0.1 sec in the present embodiment), and, conversely, when such an excessive duty is outputted for a short time, the clutch piston 27 is made to move more rapidly, which permits further shortening of the connection time. After the start duty Dst of the value thus determined has been outputted for a fixed time interval, single connection control becomes open loop control. The clutch torque point is the learning value, and when the duty value has been obtained, same is stored in the ECU 16. For example, as shown in FIG. 3, a duty D=50(%), which indicates torque capacity Tcm=approximately 200 (Nm), is the torque point learning value. When there is deviation in the torque capacity line diagram as shown by the broken line due to variations in the clutch or the like, the torque point learning value also changes accordingly.

Subsequently, once the outputting of the start duty Dst ends, a transition is made to clutch gradual connection control(t3). In other words, a gradual connection duty Dk for gradually connecting the clutch 3 is outputted from the ECU 16 at prescribed time intervals. The prescribed time interval as used here in the present embodiment is equal to a control cycle $\Delta t=20$ msec, but may also be equal to control cycles $n\Delta t$ equivalent to a plurality of cycles. Hereinbelow, this prescribed time interval is referred to as a gradual connection cycle.

A characterizing feature of this gradual connection control is that the value of each gradual connection duty for each gradual connection cycle is determined on the basis of the clutch input/output revolution difference. The value of the engine revolution number detected by the engine revolution sensor 18 is employed as the clutch input side revolution number. This is because, while the vehicle is traveling, the lockup clutch is connected and it is considered that the clutch input-side revolution number=the engine revolution number. As the clutch output-side revolution number, the value of the input shaft revolution number which is calculated from the output of the transmission revolution sensor 20 and the gear ratio, as described hereinabove, is used.

Figure 5D:
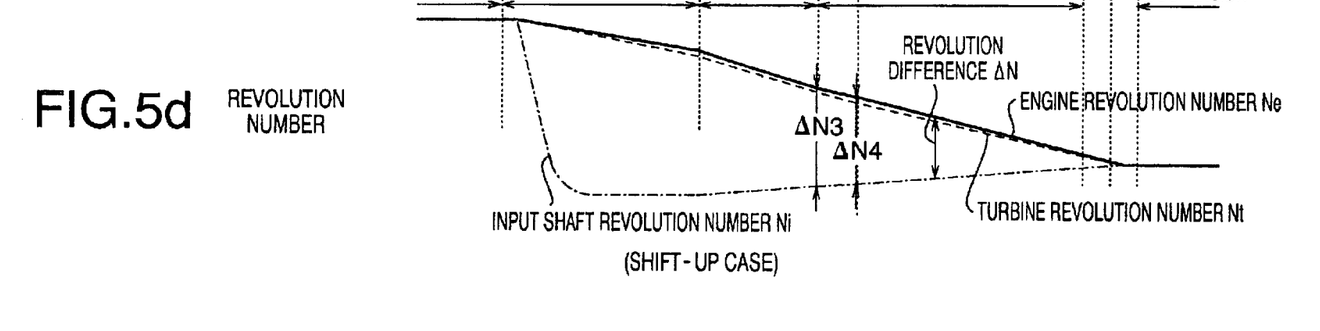

Since a shift-up is made here, the engine revolution number Ne is higher than the input shaft revolution number Ni, as shown in FIG. 5d. The revolution difference $\Delta N$ is therefore calculated by subtracting the input shaft revolution number Ni from the engine revolution number Ne ($\Delta N=Ne-Ni$).

As shown in FIG. 7, for each transmission gear level, the value of the step duty Ds with respect to the revolution difference $\Delta N$ is set using a map format. This step duty calculaton map is stored in the ECU 16.

The specific details of clutch gradual connection control are as provided hereinbelow. First, in the gradual connection cycle of time t3, a gradual connection duty Dk3 constituting an initial value is outputted. Then, the revolution difference $\Delta N3$ at this time is calculated, and a step duty Ds3 is determined according to the map in FIG. 7 from the current gear level and the value of $\Delta N3$. Then, in the gradual connection cycle of time t4, which is the next control cycle, a value produced by subtracting the step duty Ds3 from the previous gradual connection duty Dk3 is made the present gradual connection duty Dk4, and is outputted from the ECU 16. Thereafter, similarly, a revolution difference $\Delta Nn$ is calculated in the gradual connection cycles of times tn (n=4, 5, 6 . . . ), and a step duty Dsn is determined according to the map in FIG. 7, and in the gradual connection cycle of a time tn+1, which is the next control cycle, the step duty Dsn is subtracted from the previous gradual connection duty Dkn and is made the present gradual connection duty Dkn+1, and is outputted from the ECU 16. By repeating such control, the clutch is connected a little at a time, and the revolution difference $\Delta N$ grows steadily smaller.

The step duty Ds calculation cycle and the control cycle $\Delta t$ need not necessarily be equal. At such time, each time the step duty Ds is calculated, the gradual connection duty Dk is updated, and this update cycle constitutes the gradual connection cycle.

Thus, if prescribed gradual connection end conditions exist, the gradual connection control ends, and a transition is made to clutch rapid connection control. The gradual connection end conditions of the present embodiment are that the revolution difference $\Delta N$ is a small value and equal to or less than 150 rpm, or that the duty outputted from the ECU 16 reaches a gradual connection end duty De which is a value for when the clutch is adequately connected. In clutch rapid connection control, the rapid connection duty=0 and this is outputted for a prescribed time interval equal to 0.3 sec. Then, thereafter, clutch complete connection control is performed to thereby end the clutch connection control. Similarly in clutch complete connection control, the complete connection duty=0, and this is outputted for a prescribed time interval equal to 1 sec.

Figure 6D:
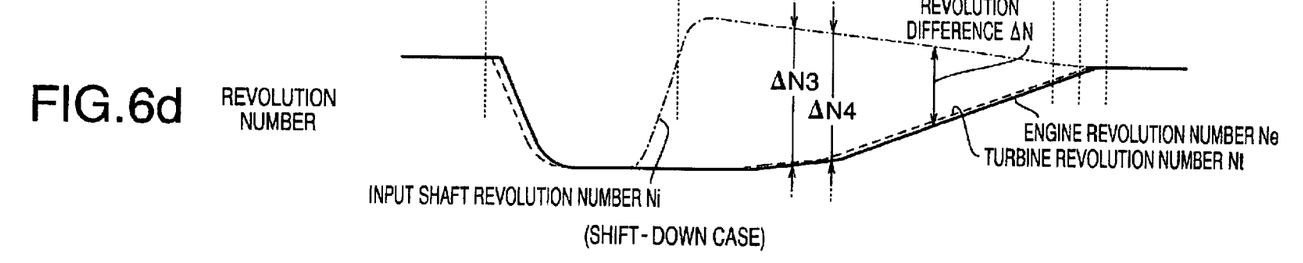

A description follows using FIGS. 6 and 8 for a shift-down case. Clutch control is largely the same at the time of a shift-down and a shift-up. A point of difference is that, at the time of a shift-down, as shown in FIG. 6d, since the input shaft revolution number Ni is higher that the engine revolution number Ne, calculation of the revolution difference $\Delta N$ is also reversed in that the revolution difference $\Delta N$ is calculated by subtracting the engine revolution number Ne from the input shaft revolution number Ni ($\Delta N=Ni-Ne$). Another point of difference is that values for the step duty Ds are set separately from a shift-up case, more specifically, a shift-down step duty calculation map of the kind shown in FIG. 8 is prepared separately. In this map, values are suited to shift-down.

Details of further clutch connection control are the same as provided above. In gradual connection control, the gradual connection duty Dk3 constituting an initial value is outputted in the gradual connection cycle of time t3, the revolution difference ΔN3 is calculated, and the step duty Ds3 is determined according to the map in FIG. 8 from the present gear level and the value of ΔN3. Then, in the gradual connection cycle of time t4, which is the next control cycle, a value produced by subtracting the step duty Ds3 from the previous gradual connection duty Dk3 is made the present gradual connection duty Dk4, and is outputted from the ECU 16. Thereafter, by repeating such a process, the clutch is connected a little at a time. The subsequent clutch rapid connection control and clutch complete connection control are performed in the same way as described above.

As described hereinabove, in the present embodiment, at the time of clutch gradual connection, since control, by which the clutch is connected while continually observing the actual connection status, that is, the clutch input/output revolution difference, is executed instead of performing open loop control by which a connection is made in accordance with a predetermined schedule, it is possible to suit the control to individual clutch differences such as variations in the torque point learning value, in the clutch characteristics, or in the oil temperature, and the like, and/or to deviations in the usage conditions, to thereby continually achieve compatibility between connection shock and connection time, such that variations in the feel caused by the above-mentioned variations can be resolved and it is possible to achieve a stable feel.

Also, since two types of step duty are set for a shift-up and a shift-down, clutch gradual connection can be performed to suit a shift-up and a shift-down respectively. In addition, since a step duty is set for each gear level, it is possible to perform a gradual connection of the clutch which is suited to each gear level.

Moreover, the embodiments of the present invention are not limited to or by the embodiment described hereinabove. In the embodiment above, the duty reduction direction was made the clutch connection direction, but the reverse direction is also possible. At such time, the present gradual connection duty is determined by adding the step duty to the previous gradual connection duty such that the gradual connection duty steadily increases. The wet friction clutch in the present invention is a multi-plate clutch in the above embodiment but may also be single-plate clutch, for example. Also, the fluid pressure in the present invention is an oil pressure in the above embodiment but may also be another fluid pressure such as an air pressure. The transmission in the present invention is an ordinary meshing manual transmission in the embodiment above, but may also be an ordinary meshing automatic transmission (equipped with an auto shifter) or a planet gear automatic transmission as in an AT vehicle, for example. Any engine type is possible, such as a diesel engine, kerosene engine, and so forth. The present invention can also be applied to a power transmission device without a concomitant fluid coupling.

As described hereinabove, with the present invention, excellent effects are exhibited, namely that of permitting compatibility between connection time and connection shock during gradual connection of the clutch irrespective of individual differences between clutches and the like and/or of differences in the usage conditions, and that of making it possible to achieve a stable feel.

[Second Control Method]

The clutch control method while the vehicle is traveling will now be described using FIGS. 5a–5d and 6a–6d. FIGS. 5a–5d is a representative shift-up example, and FIGS. 6a–6d is a representative shift-down example. A shift-up example will be described first.

As shown in FIGS. 5a–5d, the clutch is completely disconnected as a result of the knob switch being ON (t1), and when the shift lever is operated for the next gear shift level, clutch connection commences (t2). At the same time as the vehicle is put into gear, a comparison between the previous gear level and the current gear level is conducted and a judgement is made of a shift-up or a shift-down A shift-up is considered here.

Further, clutch connection mode selection is performed separately at the same time as the vehicle is put into gear. This will be described hereinafter.

Single connection control is initially executed for the clutch connection. In other words, a start duty (single connection duty) Dst for largely connecting the clutch 3 as far as the vicinity of the torque point is outputted for a fixed time interval (0.1 sec in the present embodiment) from the ECU 16. The start duty Dst of the present embodiment is 10(%) when the temperature is normal and 60(%) when the temperature is low. An invalid stroke (idle stroke) of the clutch piston 27 is present in the clutch 3 at the start of connection, but, by means of single connection control, a rapid connection is made for this invalid stroke, which in turn permits a shortening of the connection time. Here, referring to FIG. 3, the start duty Dst=10(%) when the temperature is normal is a value that corresponds to the complete connection of the clutch, but the output time interval for this start duty is minimal (0.1 sec in the present embodiment), and, conversely, when such an excessive duty is outputted for a short time, the clutch piston 27 is made to move more rapidly, which permits further shortening of the connection time. The clutch torque point is the learning value, and when the duty value has been obtained, same is stored in the ECU 16. For example, as shown in FIG. 3, a duty D=50(%), which indicates torque capacity Tcm=approximately 200 (Nm), is the torque point learning value. When there is deviation in the torque capacity line diagram as shown by the broken line due to variations in the clutch or the like, the torque point learning value also changes accordingly.

Subsequently, once the outputting of the start duty Dst ends, a transition is made to clutch gradual connection control (t3). In other words, a gradual connection duty Dk for gradually connecting the clutch 3 is outputted from the ECU 16 at prescribed time intervals. The prescribed time interval as used here in the present embodiment is equal to a control cycle Δt=20 msec, but may also be equal to control cycles nΔt equivalent to a plurality of cycles. Hereinbelow, this prescribed time interval is referred to as a gradual connection cycle.

In gradual connection control, the value of the gradual connection duty for each gradual connection cycle is determined on the basis of the clutch input/output revolution difference. The value of the engine revolution number detected by the engine revolution sensor 18 is employed as the clutch input side revolution number. This is because, while the vehicle is traveling, the lockup clutch is connected and it is considered that the clutch input-side revolution number=the engine revolution number. However, the turbine revolution number may also be used. As the clutch output-side revolution number, the value of the input shaft revolution number which is calculated from the output of the transmission revolution sensor 20 and the gear ratio, as described hereinabove, is used.

A shift-up example will be considered here. The engine revolution number Ne is higher than the input shaft revolution number Ni, as shown in FIG. 5d. The ECU 16 calculates a revolution difference ΔN by subtracting an input shaft revolution number Ni from an engine revolution number Ne (ΔN=Ne−Ni), based on a shift-up judgement which is made at time t2.

Figure 11:
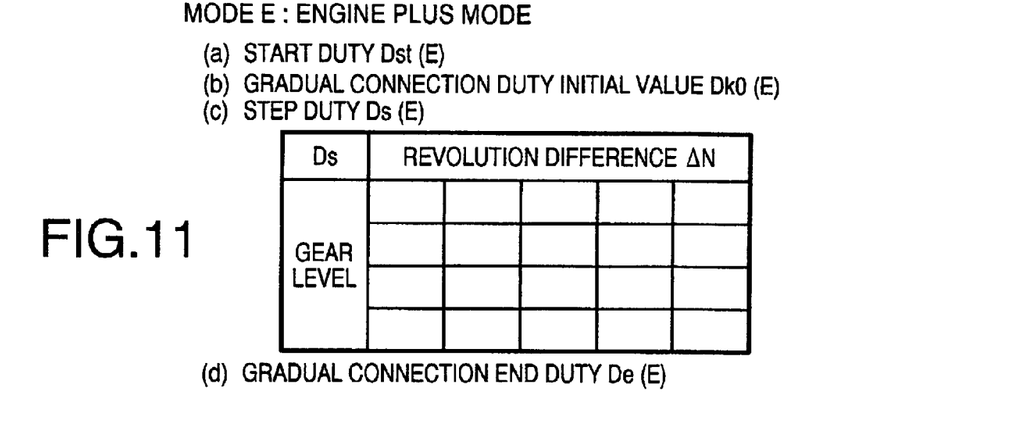
FIG. 11 shows the details of the engine plus mode.

More detail will be provided hereinbelow, but, as shown in FIG. 11, the value of a step duty Ds with respect to the revolution difference ΔN is set, using a map format, for each transmission gear level. This step duty calculation map is stored in the ECU 16.

The specific details of clutch gradual connection control are as provided hereinbelow. First, in the gradual connection cycle of time t3, a gradual connection duty Dk3 constituting an initial value is outputted. Then, the revolution difference ΔN3 at this time is calculated, and a step duty Ds3 is determined according to the map in FIG. 11 from the current gear level and the value of ΔN3. Then, in the gradual connection cycle of time t4, which is the next control cycle, a value produced by subtracting the step duty Ds3 from the previous gradual connection duty Dk3 is made the present gradual connection duty Dk4, and is outputted from the ECU 16. Thereafter, similarly, a revolution difference ΔNn is calculated in the gradual connection cycles of times tn (n=4, 5, 6 . . . ), and a step duty Dsn is determined according to the map, and in the gradual connection cycle of a time tn+1, which is the next control cycle, the step duty Dsn is subtracted from the previous gradual connection duty Dkn and is made the present gradual connection duty Dkn+1, and is outputted from the ECU 16. By repeating such control, the clutch is connected a little at a time, and the revolution difference ΔN grows steadily smaller.

The step duty Ds calculation cycle and the control cycle Δt need not necessarily be equal. At such time, each time the step duty Ds is calculated, the gradual connection duty Dk is updated, and this update cycle constitutes the gradual connection cycle.

Thus, if prescribed gradual connection end conditions exist, the gradual connection control ends, and a transition is made to clutch rapid connection control. The gradual connection end conditions of the present embodiment are that the revolution difference ΔN is a small value and equal to or less than 150 rpm, or that the duty outputted from the ECU 16 reaches a gradual connection end duty De which is a value for when the clutch is adequately connected. In clutch rapid connection control, the rapid connection duty=0 and this is outputted for a prescribed time interval equal to 0.3 sec. Then, thereafter, clutch complete connection control is performed to thereby end the clutch connection control. Similarly in clutch complete connection control, the complete connection duty=0, and this is outputted for a prescribed time interval equal to 1 sec.

Figure 12:
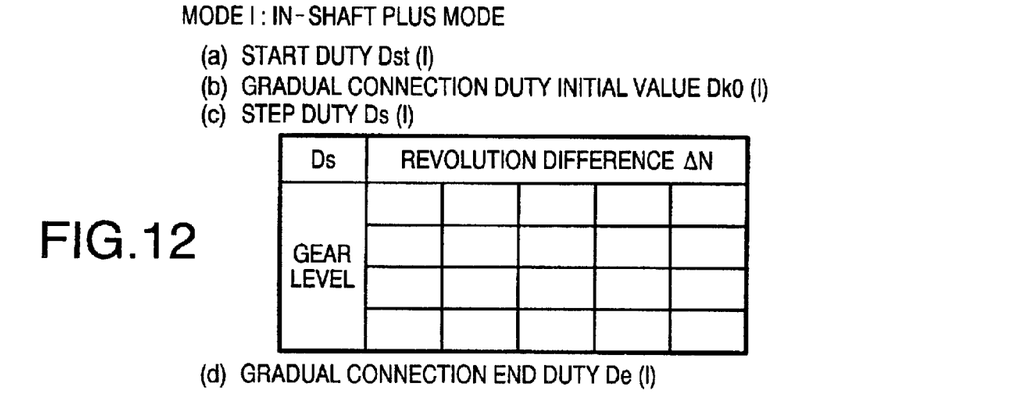
FIG. 12 shows the details of the in-shaft plus mode.

Next, a general shift-down example will be described using FIGS. 6a–6d. Clutch control is largely the same at the time of a shift-down and a shift-up. A point of difference is that, at the time of a shift-down, as shown in FIG. 6d, since the input shaft revolution number Ni is higher that the engine revolution number Ne, calculation of the revolution difference ΔN is also reversed in that the revolution difference ΔN is calculated by subtracting the engine revolution number Ne from the input shaft revolution number Ni (ΔN=Ni−Ne). Further, the value of the step duty Ds is a number calculated from a separate map which is shown in FIG. 12.

Details of further clutch connection control are the same as provided above. In gradual connection control, the gradual connection duty Dk3 constituting an initial value is outputted in the gradual connection cycle of time t3, the revolution difference ΔN3 is calculated, and the step duty Ds3 is determined according to the map in FIG. 12 from the present gear level and the value of ΔN3. Then, in the gradual connection cycle of time t4, which is the next control cycle, a value produced by subtracting the step duty Ds3 from the previous gradual connection duty Dk3 is made the present gradual connection duty Dk4, and is outputted from the ECU 16. Thereafter, by repeating such a process, the clutch is connected a little at a time. The subsequent clutch rapid connection control and clutch complete connection control are performed in the same way as described above.

In the above-described clutch gradual connection control, since the clutch is connected while continually monitoring the actual connection conditions, namely the clutch input/output revolution difference, there is an advantage that it is possible to suit the control to individual clutch differences such as variations in the torque point learning value, in the clutch characteristics, or in the oil temperature, and the like, and/or to deviations in the usage conditions, to thereby continually achieve compatibility between connection shock and connection time, such that variations in the feel caused by the above-mentioned variations can be resolved and it is possible to achieve a stable feel.

Next, clutch connection mode selection, which is a characteristic feature relating to the present invention, will be described in detail. This clutch connection mode selection is carried out at time t2 in FIGS. 5a–5d and FIGS. 6a–6d.

Figure 9:
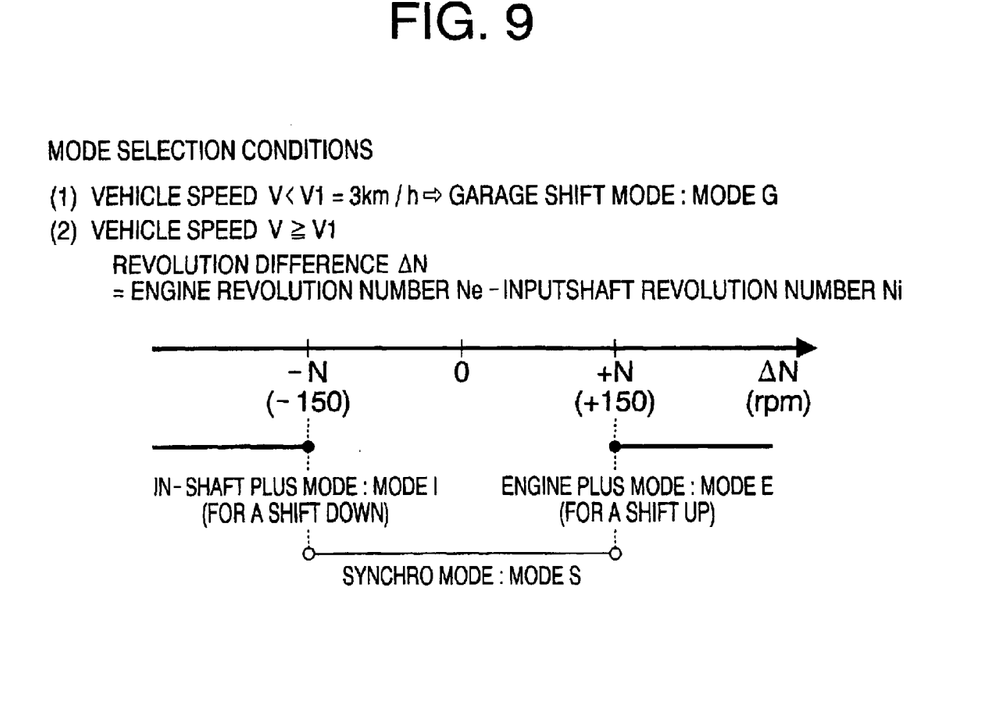
FIG. 9 shows conditions for selecting a clutch connection mode.

Referring now to FIG. 9, the four modes below are preset in the ECU 16 as clutch connection modes:

(1) Garage shift mode (mode G);
(2) Engine plus mode (mode E);
(3) In-shaft plus mode (mode I);
(4) Synchro mode (mode S).

Further, the ECU 16 selects any given mode on the basis of the vehicle speed V at time t2 in FIGS. 5 and 6, and the clutch input/output side revolution difference ΔN (=engine revolution number Ne—the input shaft revolution number Ni; ΔN2 in FIGS. 5 and 6). The conditions for selection are as below.

(1) When the vehicle speed V is less than a very low speed V1 (3 km/h in the present embodiment), the garage shift mode is selected.

(2) When the vehicle speed V is equal to or greater than the very low speed V1:

1) When the revolution difference ΔN is equal to or greater than a positive prescribed value +N (+150 rpm in the present embodiment), engine plus mode is selected.

2) When the revolution difference ΔN is equal to or less than a negative prescribed value −N (−150 rpm in the present embodiment), in-shaft plus mode is selected.

3) When the revolution difference ΔN is smaller than a positive prescribed value +N and greater than a negative prescribed value −N, synchro mode is selected.

In actuality, since it is difficult to deal with negative values using the ECU 16, the conditions in 1), 2), 3) of (2) are substituted as below.
Namely, (a) the engine revolution number≧the input shaft revolution number+150 rpm;
(b) the engine revolution number<the input shaft revolution number+150 rpm;
(c) the input shaft revolution number≧the engine revolution number+150 rpm; and
(d) the input shaft revolution number<the engine revolution number+150 rpm.

According to such conditions, when (a) is established, engine plus mode is selected.
When (c) is established, in-shaft plus mode is selected.
When (b) and (d) are established, synchro mode is selected.

Figure 10:
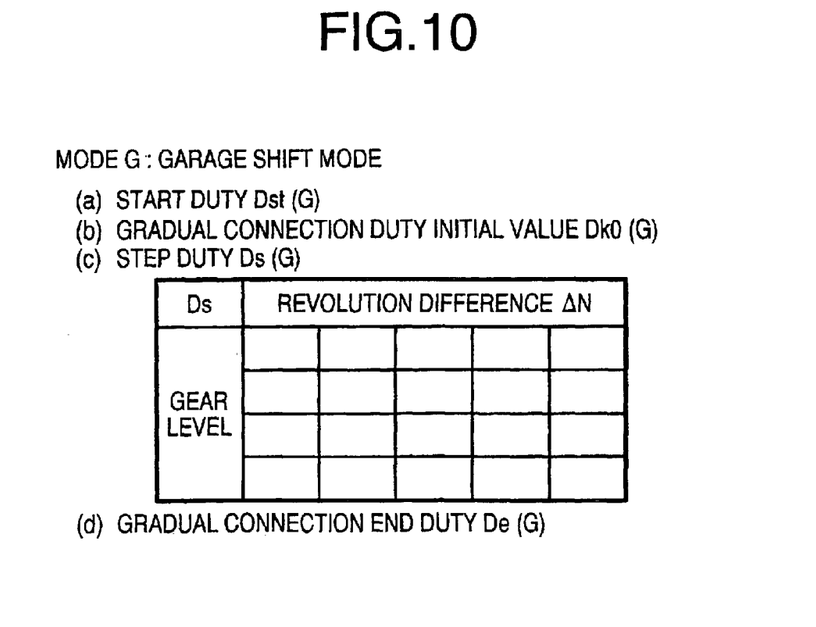
FIG. 10 shows the details of the garage shift mode.

The garage shift mode (mode G) is a mode for performing a clutch connection suited to a so-called garage shift (with an AT vehicle, the practice of putting the vehicle into gear such that creep is generated, while the vehicle is stationary before starting off). In other words, as shown in FIG. 10, values for a start duty Dst(G), a gradual connection duty initial value Dk0(G), a step duty Ds(G), and an end duty De(G), which are suited to a garage shift, are preset. When the vehicle speed is less than a vehicle speed V1 (3 km/h), this mode is selected, and, thereafter, clutch connection control is performed by using each duty of this mode. Consequently, it is possible to perform a suitable clutch connection at the time of a garage shift, such that compatibility between connection shock and connection time is feasible and a favorable feel is obtained. Here, the step duty Ds(G) is provided by means of a map format whose parameters are the gear level and the revolution difference $\Delta N$. Values at respective points on the map are values suited to a garage shift.

The engine plus mode (mode E) is principally a mode that performs a clutch connection suited to a shift-up. In other words, as shown in FIG. 11, values for a start duty Dst(E), a gradual connection duty initial value Dk0(E), a step duty Ds(E), and an end duty De(E), which are suited to a shift-up, are preset. As described above, the step duty Ds(E) is provided by means of a map format whose parameters are the gear level and the revolution difference $\Delta N$.

As shown in FIG. 5d, generally, at the time of a shift-up, the engine revolution number is higher than the input shaft revolution number, and the revolution difference $\Delta N$ assumes a positive value. On the other hand, when the vehicle speed is equal to or greater than a vehicle speed V1 (3 km/h) and the revolution difference $\Delta N$ is equal to or greater than a positive prescribed value +N (+150 rpm); the engine plus mode is selected, and, thereafter, clutch connection control is performed by using each duty of this mode. Consequently, it is possible to perform a suitable clutch connection at the time of a clutch connection following a shift-up, such that compatibility between connection shock and connection time is feasible and a favorable feel is obtained.

The in-shaft plus mode (mode I) is principally a mode that performs a clutch connection suited to a shift-down. In other words, as shown in FIG. 12, values for a start duty Dst(I), a gradual connection duty initial value Dk0(I), a step duty Ds(I), and an end duty De(I), which are suited to a shift-down, are preset. As described above, the step duty Ds(I) is provided by means of a map format whose parameters are the gear level and the revolution difference $\Delta N$.

As shown in FIG. 6d, generally, at the time of a shift-down, the input shaft revolution number is higher than the engine revolution number, and the revolution difference $\Delta N$ assumes a negative value, which is the opposite of a shift-up case. On the other hand, when the vehicle speed is equal to or greater than a vehicle speed V1 (3 km/h) and the revolution difference $\Delta N$ is equal to or less than a negative prescribed value $-N$ ($-150$ rpm), the in-shaft plus mode is selected, and, thereafter, a clutch connection is performed by using each duty of this mode. Consequently, it is possible to perform a suitable clutch connection at the time of a clutch connection following a shift-down, such that compatibility between connection shock and connection time is feasible and a favorable feel is obtained.

Figure 13:
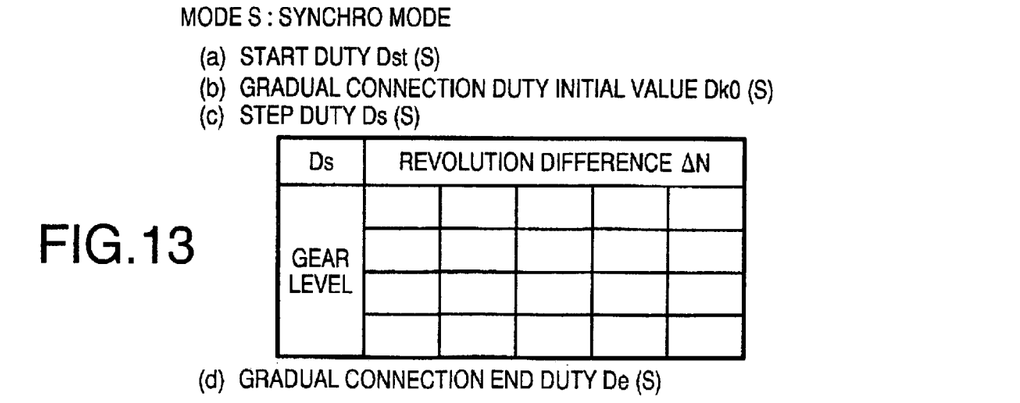
FIG. 13 shows the details of the synchro mode.

The synchro mode (mode S) is a mode that performs a clutch connection suited to a case where the clutch input/output side revolution difference is small, or, stated differently, to a case where the clutch input-side and output-side revolution numbers approach one another. In other words, as shown in FIG. 13, values for a start duty Dst(S), a gradual connection duty initial value Dk0(S), a step duty Ds(S), and an end duty De(S), which are suited to such a case, are preset. As described above, the step duty Ds(S) is provided by means of a map format whose parameters are the gear level and the revolution difference $\Delta N$.

Therefore, when the clutch input-side and output-side revolution numbers approach one another, the synchro mode is selected, and, thereafter, since a clutch connection is performed by using each duty of this mode, a clutch connection which is suited to such a case is performed, such that compatibility between connection shock and connection time is feasible and a favorable feel is obtained.

According to the present embodiment, at the time of a clutch connection following completion of a gear shift while the vehicle is traveling, an optimum clutch connection mode is selected in accordance with the size of clutch input-side and output-side revolution numbers upon completion of a gear shift, irrespective of whether a shift-up or a shift-down is actually performed. Specifically, any one of an engine plus mode, an in-shaft plus mode, and a synchro mode is selected in accordance with the revolution difference $\Delta N$, and clutch connection is performed according to this selected mode.

As a result, it becomes possible to obtain a suitable clutch connection feel under any conditions. In other words, in an ordinary shift-up or shift-down, the engine plus mode or in-shaft plus mode is selected to thereby obtain a suitable clutch connection feel.

On the other hand, when the driver performs a gear-shift operation which differs from the norm, for example, when a shift-down is performed such that, in third gear, while the vehicle is traveling, the vehicle is temporarily put into neutral, and then put into second gear after coasting a short while until the vehicle speed has dropped sufficiently, when the vehicle is put into second gear, the input shaft revolution number is then already lower than for an ordinary shift-down case.

In such a case, if conditions for selecting the engine plus mode are arranged, this mode is selected, and a clutch connection is then executed which is dependent on whether a shift-up has been performed, as it were. Further, if conditions for selecting the synchro mode are arranged, this mode is selected, and a clutch connection is then executed which is suited to such a case. Therefore, irrespective of whether the gear-shift operation actually performed is a shift-up or a shift-down, since a clutch connection conforming to the actual conditions is carried out, a suitable connection feel can be obtained.

The embodiment of the present invention is not limited to or by the embodiment described above. In the embodiment described above, three modes constituting clutch connection modes at the time of a gear shift while the vehicle is traveling, namely the engine plus mode, the in-shaft plus mode, and the synchro mode, are selected. However, the number of modes and the mode types can be suitably modified. Furthermore, the applicability of the present invention extends beyond a power transmission device of the kind described above. There are no particular requirements with regard to the form of the clutch or the transmission.

According to the present invention as described hereinabove, as far as clutch connection control at the time of a gear shift is concerned, superior effects are exhibited, namely that a suitable clutch connection feel is obtained, under any conditions.

What is claimed is:

1. A clutch control method for controlling connection/disconnection of a clutch by changing a working fluid pressure for driving connection/disconnection of a wet friction clutch in accordance with a duty pulse outputted from an electronic control unit, said method comprising the steps of:

initially outputting from the electronic control unit a prescribed start duty for largely connecting the clutch as far as a vicinity of a torque point when connecting the clutch from a disconnected stat;

outputting from the electronic control unit at prescribed time intervals a prescribed gradual connection duty for gradually connecting the clutch; and determining on the basis of a clutch input/output side revolution difference a gradual connection duty value of each prescribed time interval;

wherein said wet friction clutch is between the engine and the transmission and serially provided downstream of a fluid coupling capable of lockup, and said clutch input/output side revolution difference is determined based on the engine revolution number when the fluid coupling is locked up, and the transmission input shaft revolution number.

2. The clutch control method according to claim 1, wherein said clutch input/output side revolution difference is a value produced by subtracting the input shaft revolution number from the engine revolution number for a shift-up case, and, by subtracting the engine revolution number from the input shaft revolution number for a shift-down case.

3. The clutch control method according to claim 2, wherein said gradual connection duty value at prescribed time intervals is calculated by adding or subtracting a step duty, determined on the basis of said clutch input/output side revolution difference, with respect to the previous gradual connection duty value; and two types are set for this step duty value at least for a shift-up case and for a shift-down case.

4. The clutch control method according to claim 2, wherein in the course of said gradual connection duty output, if said clutch input/output side revolution difference reaches or becomes lower than a prescribed value, a duty corresponding to a complete connection of the clutch is outputted by said electronic control unit.

5. The clutch control method according to claim 1, wherein said gradual connection duty value at prescribed time intervals is calculated by adding or subtracting a step duty, determined on the basis of said clutch input/output side revolution difference, with respect to the previous gradual connection duty value; and two types are set for said step duty value at least for a shift-up case and for a shift-down case.

6. The clutch control method according to claim 5, wherein in the course of said gradual connection duty output, if said clutch input/output side revolution difference reaches or becomes lower than a prescribed value, a duty corresponding to a complete connection of the clutch is outputted by said electronic control unit.

7. The clutch control method according to claim 5, wherein said step duty value is selected from a map whose parameters are taken to be said transmission gear level and said clutch input/output side revolution difference.

8. The clutch control method according to claim 7, wherein in the course of said gradual connection duty output, if said clutch input/output aids revolution difference reaches or becomes lower than a prescribed value, a duty corresponding to a complete connection of the clutch is outputted by said electronic control unit.

9. The clutch control method according to claim 1, wherein in the course of said gradual connection duty output, if said clutch input/output side revolution difference reaches or becomes lower than a prescribed value, a duty corresponding to a complete connection of the clutch is outputted by said electronic control unit.

10. The clutch control method according to claim 1, wherein said gradual connection duty value at prescribed time intervals is calculated by adding or subtracting a step duty, determined on the basis of said clutch input/output side revolution difference, with reaped to the previous gradual connection duty value; and two types are set for this step duty value at least for a shift-up case and for a shift-down case.

11. The clutch control method according to claim 1, wherein in the course of said gradual connection duty output, if said clutch input/output side revolution difference reaches or becomes lower than a prescribed value, a duty corresponding to a complete connection of the clutch is outputted by said electronic control unit.

12. A clutch control method for controlling connection/disconnection of a clutch in accordance with a duty purse which is outputted from an electronic control unit, in a vehicle power transmission device in which a wet friction clutch is provided midway along a power transmission path extending from the engine to the transmission, said method comprising the steps of:

commencing clutch connection control at the same time as the transmission is geared into a next gear shift level during a gear shift while the vehicle is traveling;

outputting from the above electronic control unit a duty corresponding to a complete connection of the clutch during clutch gradual connection control, if the clutch input/output side revolution difference reaches or becomes lower than a prescribed value; and wherein a fluid coupling capable of lockup is provided upstream of said wet friction clutch in said power transmission path; said clutch input-side revolution number is the engine revolution number during lockup of said fluid coupling, and said clutch output-side revolution number is said transmission input shaft revolution number, and, said revolution difference is a value produced by subtracting said input shaft revolution number from said engine revolution number for a shift-up case, and, by subtracting said engine revolution number from said input shaft revolution number for a shift-down case.

13. A clutch control method, said method comprising the steps of:

disconnecting a clutch in sync with the start of a transmission gear shift by means of an electronic control unit; and connecting the clutch in sync with completion of the transmission gear shift;

wherein, with regard to clutch connection control, a plurality of clutch connection modes are preset, and said clutch connection modes are selected in accordance with the size of a clutch input-side revolution number and output-side revolution number upon completion of a gear shift; and wherein said clutch is provided serially downstream of a fluid coupling capable of lockup which is between an engine and a transmission; said clutch input-side revolution number is an engine revolution number upon lockup of the fluid coupling; and said clutch output-side revolution number is a transmission input shaft revolution number.

14. The clutch control method according to claim 13, wherein said plurality of clutch connection modes comprise a first mode, which is applied when a revolution difference, which is obtained by subtracting the clutch output-side revolution number from the crutch input-side revolution number upon gear shift completion, is equal to or greater than a positive first prescribed value; a second mode, which is applied when said revolution difference is equal to or less than a negative second prescribed value; and a third mode, which is applied when said revolution difference is smaller than said positive first prescribed value and is greater than said negative second prescribed value.

15. The clutch control method according to claim 13, wherein said clutch is controlled by being disconnected/connected in accordance with a duty pulse outputted from said electronic control unit; wherein, when performing clutch connection control, tile electronic control unit initially outputs a prescribed start duty for largely connecting the clutch as far as the vicinity of a torque point, and, thereafter, outputs, at prescribed time intervals, a prescribed gradual connection duty for gradually connecting the clutch, and determines a gradual connection duty value at each prescribed time interval on the basis of a clutch input/output side revolution difference; and wherein the start duty and the gradual connection duty are determined in each respective clutch connection mode.

16. A clutch control method, said method comprising the steps of:
  disconnecting a clutch in sync with the start of a transmission gear shift by means of an electronic control unit; and
  connecting the clutch in sync with completion of the transmission gear shift;
  wherein, with regard to clutch connection control, a plurality of clutch connection modes are preset, and said clutch connection modes are selected in accordance with the size of a clutch input-side revolution number and output-side revolution number upon completion of a gear shift; and
  wherein said clutch is controlled by being disconnected/connected in accordance with a duty pulse outputted from said electronic control unit; wherein, when performing clutch connection control, the electronic control unit initially outputs a prescribed start duty for largely connecting the clutch as far as the vicinity of a torque point, and, thereafter, output, at prescribed time intervals, a prescribed gradual connection duty for gradually connecting the clutch, and determines a gradual connection duty value at each prescribed time interval on the basis of a clutch input/output side revolution difference; and wherein the start duty and the gradual connection duty are determined in each respective clutch connection mode.

17. The clutch control method according to claim 16, wherein said gradual connection duty value at prescribed time intervals is calculated by adding or subtracting a step duty, determined on the basis of said clutch input/output side revolution difference, with respect to the previous gradual connection duty value; and two types are set for this step duty value at least for a shift-up case and for a shift-down case.

18. The clutch control method according to claim 16, wherein in the course of said gradual connection duty output, if said clutch input/output side revolution difference reaches or becomes lower than a prescribed value, a duty corresponding to a complete connection of the clutch is outputted by said electronic control unit.

19. A clutch control method, said method comprising the steps of:
  disconnecting a clutch in sync with the start of a transmission gear shift by means of an electronic control unit; and
  connecting the clutch in sync with completion of the transmission gear shift;
  wherein, with regard to clutch connection control, a plurality of clutch connection modes are preset, and said clutch connection modes are selected in accordance with size of a clutch input-side revolution number and output-side revolution number upon completion of a gear shift;
  wherein said plurality of clutch connection modes comprise a first mode, which is applied when a revolution difference, which is obtained by subtracting the clutch output-side revolution number from the clutch input-side revolution number upon gear shift completion, is equal to or greater than a positive first prescribed value; a second mode, which is applied when said revolution difference is equal to or less than a negative second prescribed value; and a third mode, which is applied when said revolution difference is smaller than said positive first prescribed value and is greater than said negative second prescribed value; and
  wherein said clutch is controlled by being disconnected/connected in accordance with a duty pulse outputted from said electronic control unit; wherein, when performing clutch connection control, the electronic control unit initially outputs a prescribed start duty for largely connecting the clutch as far as the vicinity of a torque point, and, thereafter, outputs, at prescribed time intervals, a prescribed gradual connection duty for gradually connecting the clutch, and determines a gradual connection duty value at each prescribed time interval on the basis of a clutch input/output side revolution difference; and wherein the start duty and the gradual connection duty are determined in each respective clutch connection mode.

20. A clutch control apparatus for controlling connection/disconnection of a clutch by changing a working fluid pressure for driving connection/disconnection of a wet friction clutch in accordance with a duty pulse, said apparatus comprising:
  an electronic control unit outputting said duty pulse, wherein, when connecting the clutch from a disconnected state, a prescribed start duty for largely connecting the clutch as far as a vicinity of a torque point is initially outputted from the electronic control unit, and, thereafter, a prescribed gradual connection duty for gradually connecting the clutch is outputted from the electronic control unit at prescribed time intervals, and a gradual connection duty value of each prescribed time interval is determined on the basis of a clutch input/output side revolution difference, wherein said wet friction clutch is between the engine and the transmission and serially provided downstream of a fluid coupling capable of lockup, and said clutch input/output side revolution difference is determined based on the engine revolution number when the fluid coupling is locked up, and the transmission input shaft revolution number.

* * * * *

UNITED STATES PATENT AND TRADEMARK OFFICE
CERTIFICATE OF CORRECTION

PATENT NO. : 6,889,804 B2
DATED : May 10, 2005
INVENTOR(S) : Eiji Inoue et al.

It is certified that error appears in the above-identified patent and that said Letters Patent is hereby corrected as shown below:

Column 17,
Line 14, "stat;"should read -- state; --.

Column 18,
Line 1, "aids" should read -- side --.
Line 15, "reaped" should read -- respect --.
Line 26, "purse" should read -- pulse --.

Column 19,
Line 21, "tile" should read -- the --.

Signed and Sealed this

Twelfth Day of July, 2005

JON W. DUDAS
*Director of the United States Patent and Trademark Office*